United States Patent
MacConnell (10) Patent No.: US 7,917,084 B2
(45) Date of Patent: Mar. 29, 2011

(54) CELLULAR REPEATER WATERMARKING SYSTEM AND METHOD

(75) Inventor: John MacConnell, La Canada, CA (US)

(73) Assignee: Wilson Electronics, St. George, UT (US)

( * ) Notice: Subject to any disclaimer, the term of this patent is extended or adjusted under 35 U.S.C. 154(b) by 645 days.

(21) Appl. No.: 11/744,756

(22) Filed: May 4, 2007

(65) Prior Publication Data

US 2008/0020705 A1  Jan. 24, 2008

Related U.S. Application Data

(60) Provisional application No. 60/820,036, filed on Jul. 21, 2006.

(51) Int. Cl.
*H04B 7/15* (2006.01)

(52) U.S. Cl. .......... 455/11.1; 455/9; 455/13.1; 370/226; 370/243; 370/279; 370/293; 370/315

(58) Field of Classification Search ............... 455/15, 455/11.1, 3.02, 427, 7, 12.1, 13.1, 13.2, 16
See application file for complete search history.

(56) References Cited

U.S. PATENT DOCUMENTS

| | | | |
|---|---|---|---|
| 6,005,884 A * | 12/1999 | Cook et al. ................... 375/132 |
| 6,055,082 A * | 4/2000 | Chikuma ....................... 398/31 |
| 6,442,150 B1 * | 8/2002 | Kondo et al. ................. 370/331 |
| 6,658,109 B1 * | 12/2003 | Steinke et al. ................ 379/413 |
| 6,889,033 B2 | 5/2005 | Bongfeldt .................... 455/11.1 |
| 7,062,224 B2 * | 6/2006 | Baker et al. ...................... 455/9 |
| 2002/0045431 A1 * | 4/2002 | Bongfeldt .................. 455/234.1 |
| 2003/0083098 A1 * | 5/2003 | Yamazaki et al. ............ 455/556 |
| 2004/0165657 A1 * | 8/2004 | Simic et al. .................... 375/211 |
| 2004/0166873 A1 * | 8/2004 | Simic et al. ................. 455/456.1 |
| 2006/0030262 A1 * | 2/2006 | Anderson et al. .............. 455/21 |
| 2006/0276202 A1 * | 12/2006 | Moeglein et al. .......... 455/456.1 |
| 2007/0087689 A1 * | 4/2007 | Alles et al. .................. 455/11.1 |
| 2008/0279536 A1 * | 11/2008 | Levy ............................. 386/95 |

* cited by examiner

*Primary Examiner* — Dominic E Rego
(74) *Attorney, Agent, or Firm* — Workman Nydegger (57) ABSTRACT

A method and system for providing a watermark by amplitude modulating data onto signals being repeated from and/or to a cellular telephone handset without degrading the performance of the cellular telephone system. An exemplary cellular repeater system may include a first communication device configured to receive a cellular telephone signal from a handset. The cellular telephone signal is amplified by a variable gain amplifier configured to create an adjusted signal. The amplification factor applied by the variable gain amplifier is controlled by a message encoder configured in accordance with a predetermined encoding scheme. The adjusted signal is then transmitted to a base station by a second communication device.

10 Claims, 5 Drawing Sheets

CELLULAR REPEATER WATERMARKING SYSTEM AND METHOD

CROSS-REFERENCE TO RELATED APPLICATIONS

This application claims the benefit of U.S. Provisional Application No. 60/820,036, filed Jul. 21, 2006, which is incorporated herein by reference in its entirety.

BACKGROUND

1. The Field of the Invention

The present invention generally relates to cellular telephone systems. More particularly, the present invention relates to methods and systems for attaching a watermark identifier to cellular signals in a cellular repeater system.

2. The Relevant Technology

In recent years, cellular ("cell" or "mobile") telephones have dramatically increased in popularity. This increase in cell phone reliance places increased demand on network providers to provide reliable cellular signal coverage over a wider area. Use of cell phones in areas having a weak signal often results in dropped calls which can be annoying for the cell phone user and expensive for the wireless service provider. A loss of signal may occur for a number of reasons, including interference due to buildings or mountains, or an increase in distance between the cell phone and the base station. Therefore, a need exists to increase the reliability of signal coverage in a wireless network.

Attempts have been made to increase the reliability of cell phones through use of Cellular or Personal Communications Service (PCS) telephone signal boosters, also known as cellular network amplifiers and repeaters. Cellular network amplifiers are typically placed in relatively close proximity to cell phones, and serve the purpose of increasing the level of the signals being transmitted to and from the cell phones so that the cell phones can communicate with base stations that would otherwise be out of range.

There are a number of methods for repeating a cellular or PCS telephone signal into an area, such as inside a building, where the signal strength is insufficient. One such method is to mount an antenna on the outside of the building to receive the signal from a base station, amplifying the signal, and then reradiating the amplified signal into the interior of the building via an indoor antenna to one or more handsets. Similarly, signals from a handset within the building are received by the indoor antenna, amplified, and reradiated by the outdoor antenna back to the base station.

When a signal passes through such a repeater system, its level is increased. At the same time, however, the signal is also delayed by the cables leading from the outside antenna to the amplifier, from the amplifier to the inside antenna, and by various filters within the amplifier itself. The amplifier may affect the signal in other ways that may vary with each amplifier's parameters. These effects may disrupt certain system features and calculations performed by the base station. For example, if the filters of an amplifier are narrow in bandwidth, the delays can become long enough to affect the ability to measure the range to the handset from the base station's antenna. More generally, a repeater or amplifier can have a similar impact on other parameters or characteristics of the wireless network or on the signals being transmitted. If the impacts of the amplifier, such as a delay introduced to a signal, are known by the base station, the amplifier's effects can be accounted for by the base station.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

These and other limitations are overcome by embodiments of the invention, which relate to conveying the impact of a repeater system on system parameters and signals to a base station and/or to a handset. One embodiment is directed to a method of watermarking the radio frequency signal from a handset and/or base station as the signal passes through a repeater, in such a manner that the watermarked signal leaving the repeater carries encoded data regarding the type of repeater, its configuration, and/or any other desired parameters. The data carried in the watermark can then be used by the cell site or handset. This is done in such a manner that the presence of the watermark has no negative effects on the operation of the telephone system.

One exemplary cellular repeater system includes a first communication device configured to receive a cellular telephone signal (an uplink signal) from a handset. A variable gain amplifier applies a variable amplification factor to the uplink signal to create an adjusted signal. A message encoder controls the variable amplification factor in accordance with a predetermined encoding scheme. The adjusted signal is then transmitted to a base station by a second communication device. The adjusted signal is therefore encoded with information that can be used for various purposes such as described herein.

Another embodiment is directed to a method of watermarking a cellular telephone signal. The method may be practiced, for example, in a cellular repeater system. The method includes receiving an uplink signal from a handset and modulating the uplink signal in accordance with a first predetermined encoding scheme for applying a first watermark identifier to the uplink signal. The modulated uplink signal is then transmitted to a base station, which can use the watermark to account for certain effects introduced by the cellular repeater system to the uplink signal.

A further embodiment described in more detail herein includes a cellular repeater system with watermarking capabilities. The system includes a first antenna for communicating signals to and from a base station and a second antenna for communicating signals to and from a handset. A first variable gain module applies a first amplification factor to the signals received from the base station, and a second variable gain module applies a second amplification factor to the signals received from the handset. At least one message encoder is provided for controlling the first amplification factor and/or the second amplification factor in accordance with a predetermined encoding scheme.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention. The following detailed description, therefore, is not to be taken in a limiting sense, and the scope of the present invention is defined by the appended claims.

Embodiments of the present invention relate to a method and repeater system for applying a watermark to signals that allow data to be encoded onto the handset's uplink signal from the handset as it passes through the amplifier of a repeater system and is retransmitted to a base station without adversely affecting the operation of the cellular telephone system. Similarly, data can be encoded onto a downlink signal from the base station as it passes through the amplifier and is communicated to a handset, also without adversely affecting the operation of the cellular telephone system.

For purposes of the present invention, the following definitions are provided. The terms "cellular", "cellular system", and "cellular network" refer to a wireless telephone network that connects radio transmissions between a mobile phone and a system of multiple cell sites, each including an antenna and a base station, to a mobile telephone switching office, and ultimately to the public wireline telephone system. Cellular calls are transferred from base station to base station as a user travels from cell to cell. One of skill in the art can appreciate that embodiments of the invention can be applied to other wireless networks including those operating on various frequencies throughout the electromagnetic spectrum.

By way of example, the phrase "cell phone" refers to a wireless device that sends and receives messages using radio frequency signals in the 800-900 megahertz (MHz) portion of the radiofrequency (RF) spectrum, and the phrase "PCS phone" (personal communication system phone) refers to a wireless device that uses radiofrequency signals in the 1850-1990 MHz portion of the RF spectrum. For purposes of simplicity, as used herein, the terms "cell phone" and "handset" are intended to cover both "cell phone" and "PCS phone", as defined above, as well as other handheld devices. Likewise, as used herein, the phrase "cellular signal" refers to signals being transmitted both in the cell phone spectrum (i.e., 800-900 MHz) and in the PCS spectrum (i.e., 1850-1990 MHz). One of skill in the art can appreciate that embodiments of the invention are not limited to operation in these frequency spectrums, but can be applied in other portions of the frequency spectrum as well. In addition, other wireless devices such as personal digital assistants, laptop computers, and the like can benefit from embodiments of the invention.

"Cell site" and "base station" are used herein interchangeably. Cell site and base station are defined as the location where the wireless network antenna and communications equipment are placed. A cell site or base station typically includes a transmitter/receiver, antenna tower, transmission radios and radio controllers for maintaining communication with mobile handsets within a given range.

The phrases "cellular network amplifier", "amplifier", and "repeater" are also used herein interchangeably. A cellular network amplifier may include any system or device that is capable of receiving a cellular signal, amplifying the signal, and communicating the amplified signal to a target destination.

The phrase "uplink signal" refers to the transmission path of a signal being transmitted from a handset to a base station. The phrase "downlink signal" refers to the transmission path of a signal being transmitted from the base station to the handset. The phrases "uplink" signal and "downlink" signal are not limited to any particular type of data that may be transmitted between a handset and a base station, but instead are simply used to specify the direction in which a signal is being transmitted.

Figure 1:
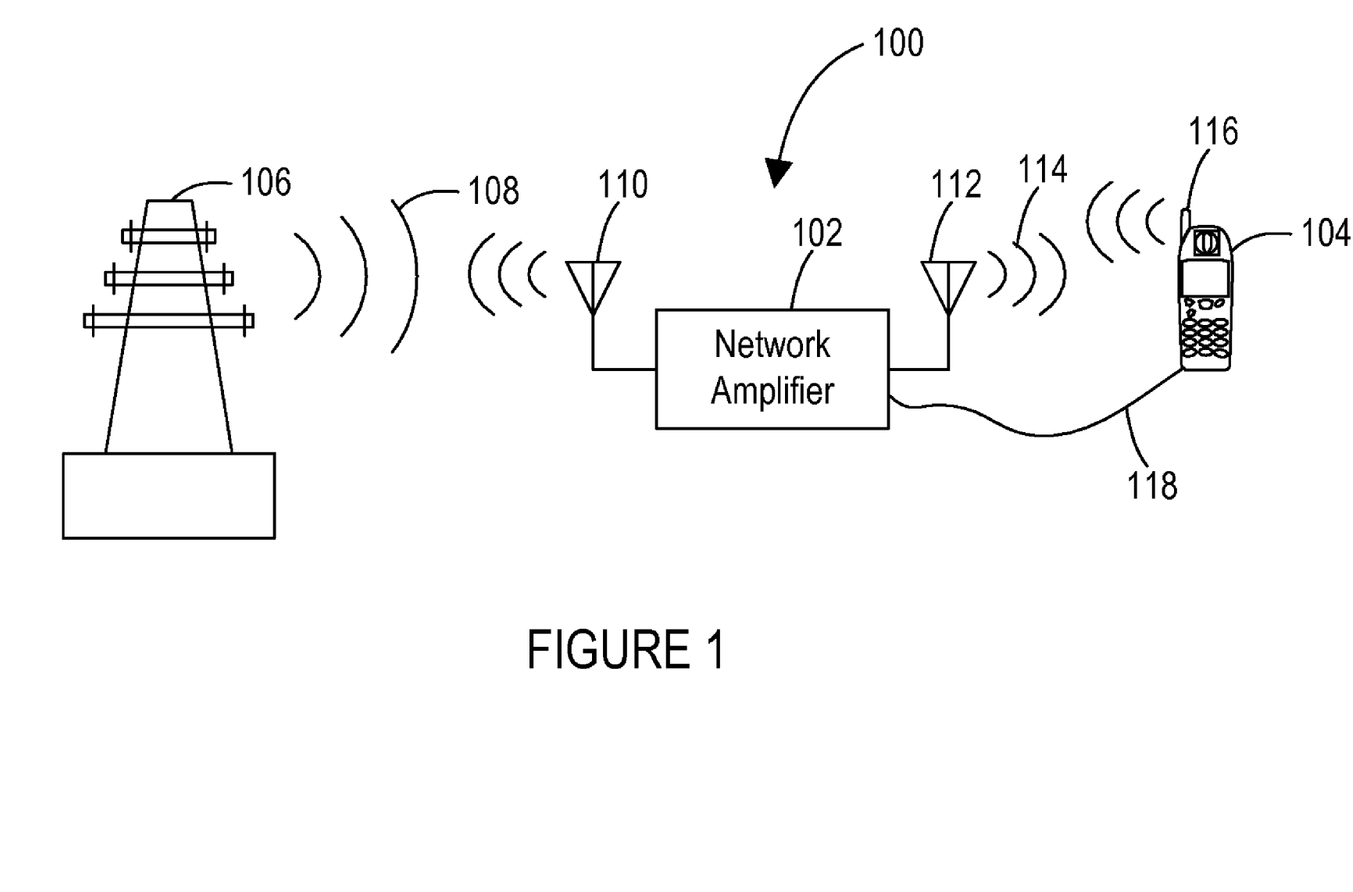
FIG. 1 is a schematic illustration of one embodiment of a cellular repeater system wherein the present invention may operate.

FIG. 1 shows an exemplary communications system 100 wherein the present invention may operate. The communications system 100 may be a cellular telephone wireless network or other wireless network. In this example, a network amplifier 102 amplifies the signals transmitted between a base station 106 and a handset 104. In a typical system, the network amplifier 102 is located in close proximity to the handset 104 in comparison to the distance to the base station 106. The base station 106 transmits a signal 108 into the surrounding air, which is attenuated for various reasons known to one of skill in the art as it travels outward from the base station 106. An antenna 110 receives the signal 108 and converts the radiated signal into a conducted electrical equivalent.

The network amplifier 102 amplifies the electrical signal and communicates the amplified signal to the handset 104, either via a wired connection 118 or via an antenna 112. In one example, the network amplifier 102 may retransmit the electrical signal from a second antenna 112 as an amplified RF signal 114. The amplified signal 114 is received by an antenna 116 of handset 104, which processes the signal and ultimately communicates the appropriate content to a user of handset 104. As previously indicated, the network amplifier 102 may be an integral part of the handset 104.

Similarly, the handset 104 may communicate content to the network amplifier 102 by transmitting an RF signal from the antenna 116, which is ultimately received by the antenna 112. The network amplifier 102 amplifies the received signal and retransmits the signal using the antenna 110. The transmitted signal is received by the base station 106, which may perform a number of operations on the signal, as determined by the wireless service provider.

As described previously, if the parameters of the amplifier, such as its delay, are known by the recipient of the signal, the recipient can compensate for the amplifier's effects. One method to notify the base station of the amplifier parameters is through the use of a "watermark" placed on the signal from the handset as it passes through the amplifier on the way to the outdoor antenna in order to identify the amplifier.

Figure 2:
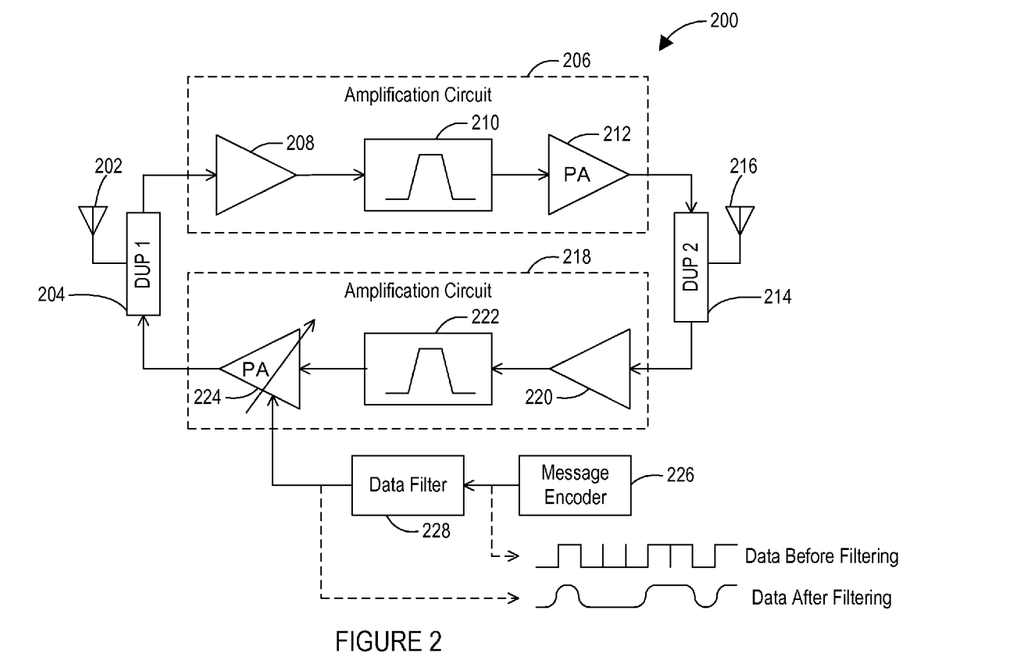
FIG. 2 is a diagram illustrating one embodiment of a repeater watermarking system according to the present invention.

FIG. 2 is one example embodiment of a watermarking and amplification system 200 according to the present invention. In this system, downlink signals from the base station or cell site are received by a first antenna 202 and pass through a duplexer 204. In one embodiment, the first antenna 202 may be located on the exterior of a building or vehicle for receiving signals prior to being further attenuated by the building or vehicle itself. The downlink signals are amplified by an amplification circuit 206. The amplification circuit 206 may perform various operations, and may include a variety of circuits for performing the operations. In addition to the amplification circuit 206 illustrated in FIG. 2, other system topologies can be used to achieve the requisite amplification, filtering, or both, without altering the operation or scope of the invention In one embodiment, the amplification circuit 206 includes a preamplifier 208, a filter 210, and a power amplifier 212. The filter 210 may be used for eliminating unwanted channels within the cellular band so that the amplification system 200 does not radiate channels originally transmitted by certain cellular providers. The filter 210 may include surface acoustic wave ("SAW") filters, digital filters, analog filters, and the like.

In one embodiment, the downlink signals received from the antenna 202 are translated to an intermediate frequency (IF) prior to being filtered and amplified, and then are translated back to their original frequency. For example, the filter 210 may require a different frequency bandwidth than the frequency bandwidth of the received downlink signals. Therefore, the downlink signals may be translated to an IF such as, for example, 70 MHz, 140 MHz, baseband, or any other frequency wherein the filter 210 can be fabricated. The choice of IF may depend on several factors including image filtering (i.e., filtering the unwanted mixer product) at the input and output. When digital filters are employed, a non-zero IF may be used, or alternatively, a zero frequency IF (baseband) could be used with I and Q (in-phase and quadrature) channels. The I and Q signals may each be sampled, filtered, and then up-converted back to their original frequency. Another benefit of translating the downlink signals to an IF is so that the filter 210 can be placed anywhere within the RF passband, and so that a reduced number of filters can be used.

The amplifiers 208 and/or 212 may include fixed gain amplifiers, variable gain amplifiers, and may further include attenuators to vary the gain located at the input, output, or both. It is possible to vary the gain of any amplifier in the amplifier chain and achieve identical results.

After being amplified and/or filtered by the amplification circuit 206, the downlink signals pass through the duplexer 214 to be retransmitted by a second antenna 216 to a handset. In one embodiment, the second antenna 216 may be located on the interior of a building or vehicle for retransmitting the amplified signal to handsets within relatively close proximity to the watermarking and amplification system 200. Although the example illustrated in FIG. 2 does not watermark the downlink signal from the cell site to the handset, in one embodiment the downlink signal may be watermarked using techniques described below.

Uplink signals transmitted from the handset, after reaching the second antenna 216, are passed through the duplexer 214 to an input to the amplification circuit 218. As mentioned previously, the amplification circuit 218 illustrated in FIG. 2 is only one example of an amplification circuit that may be used. Other system topologies can be used to achieve the requisite amplification and/or filtering without altering the operation or scope of the invention. In the present example, the amplification circuit 218 includes a preamplifier 220, a filter 222 and a power amplifier 224. The power amplifier 224 may be used to attach, embed, and/or encode a watermark identifier to the uplink signal, such that the output of amplifier 224 may include the uplink signal from the handset with the watermark data amplitude modulated onto it. Although the watermark identifier is attached to the uplink signal using the amplifier 224, it is possible to attach the watermark using the amplifier 220 as well with identical results. Therefore, the amplifiers 220 and/or 224 may include fixed gain amplifiers, variable gain amplifiers, and may also include attenuators to vary the gain located at the input, output, or both.

The uplink signals are partially amplified and filtered by the preamplifier 220 and the filter 222, respectively. In one embodiment, the watermark is applied to the uplink signal at the variable gain amplifier 224. In one embodiment, the watermark is applied by varying the gain of amplifier 224 to reflect the watermark data. The signal may be amplitude modulated by a relatively small amount, for example, 2 decibels. By slowly modifying the amplitude, a watermark can be attached to the signal without upsetting the rest of the cellular system. The watermark may also be applied to the signal using frequency modulation, for example by applying the modulation using an adjustable gain controller, such as an variable gain attenuator. As will be appreciated by one of ordinary skill, using frequency modulation to apply the watermark may result in additional circuitry, such as additional local oscillators ("LO"). Many types of modulation coding may be used, including non-return-to-zero ("NRZ"), differential Manchester, and the like.

The watermark identifier may contain any type of data that may facilitate the processing of an uplink signal received by a base station or a downlink signal received by a handset. For example, the watermark identifier may include key pieces of information, such as the delay time introduced by the amplifier, the amount of amplification performed by the amplifier, and the like. Alternatively, the watermark identifier may merely identify the cellular amplifier model. The receiver of the signal (i.e., the base station or handset) may then retrieve all relevant data relating to the amplifier model that is necessary to perform any compensation for the amplifier. Repeaters can have multiple modes of operation that can affect their delay and possibly other parameters. Therefore, the watermark may also include the mode of operation of the repeater, and/or the specific parameters that are associated with the mode of operation.

The watermark identifier may be introduced to the uplink signal as a digitized data stream from a message encoder 226. Digitized data are typically transmitted as ones and zeros with a rapid transition between the two. While it is possible to apply fast rise time data to the amplifier 224, this may adversely affect the operation of the telephone system. To avoid this, and in one exemplary embodiment, a data filter 228 can be placed between the Message Encoder, 226 and the variable gain amplifier, 224. This causes the amplitude of the repeated handset signal to have a smoother transition when the data changes from a one to a zero, or vice versa.

For example, FIG. 2 illustrates the message encoder data before filtering as having sharp edges representing ones and zeros. FIG. 2 also illustrates the message encoder data after passing through the data filter 228, where the transient edges have been reduced. Therefore, in certain embodiments, the data filter 228 may be employed to prevent system degradation from occurring. However, not all embodiments will benefit from or require the data filter 228.

In one embodiment of the invention, the data rate of the message encoder is ten bits per second with a rise time of 20 milliseconds. Encoding techniques that may be employed include Non-Return-to-Zero (NRZ), Manchester encoded, as well as other coding schemes and data rates.

One technique by which the receiver of the modulated signal (i.e., a cell site or handset) can decode the watermark data is to monitor the receiver's automatic gain control (AGC) voltage. The AGC voltage will move up and down with the watermark data modulation. This AGC variation can be decoded by a data decoder within the receiver and the data used as required by the telephone system. As will be appreciated by one of ordinary skill in the art, other techniques may also be employed by the recipient of the modulated signal to decode the watermark data.

Figure 3:
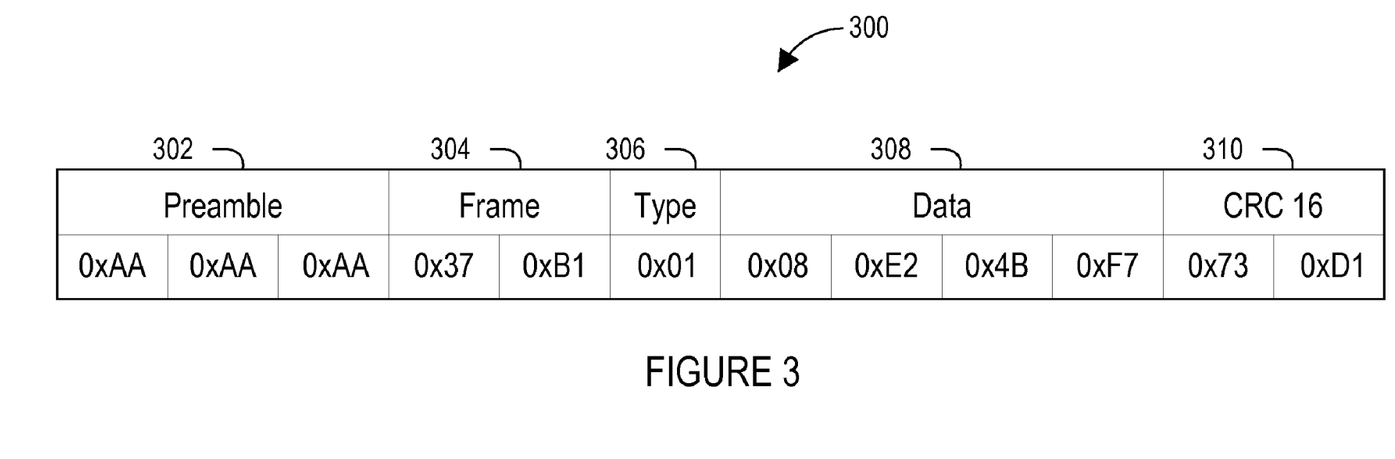
FIG. 3 is a diagram illustrating one exemplary embodiment of a Type 1 Watermark Message for use with the repeater system according to the present invention.

FIG. 3 shows an example of a watermark message 300. Other message structures can be used in addition to the structure used in message 300. Here it is assumed that NRZ encoding is used, but as described above, other encoding schemes may be employed as well. The hexadecimal bytes used herein are provided by way of example, and are not intended to limit the watermark message 300 or message structure. In one embodiment, the preamble 302 consists of a predefined pattern that may be used by a bit synchronizer at the cell site for use in finding the bit boundaries. For example, the preamble may include three bytes of 0xAA, which is a 1 0 1 0 pattern, repeated a total of six times.

In one embodiment, the preamble may be followed by two or more Frame bytes 304. The data decoder at the cell site may use a known Frame byte pattern to find the byte boundaries of the message 300. In one embodiment, the Frame bytes 304 may be followed by the message type 306. The data decoder at the cell site may use the message type information 306 to determine how to decode the rest of the message 300. Each message type 306 may have a particular message structure assigned to it. If a different structure is needed, perhaps one with a variable length data field, then a different type is assigned to this new message structure.

In one embodiment, the frame bytes may be followed by the actual data 308 being transferred. The data 308 may include any information that will facilitate the recipient of the watermark to perform any necessary compensation to the uplink or downlink signal to which the watermark is attached. In one embodiment, the first and second data bytes include the delay of the signal introduced by the repeater, measured in nanoseconds. The third and fourth data bytes may include, for example, an identifier for identifying the model of the repeater being used. Finally, in one embodiment, a Cyclic Redundancy Check (CRC 16) 310 may be used to check for message errors.

Note that FIG. 3 merely illustrates one example of a message type. Messages can have different structures, and each message structure is assigned a type. The data decoder at the cell site is preprogrammed to recognize the structure for each message type. Messages can be Manchester encoded, NRZ encoded, or encoded using other formats. Neither the encoding method, the message structure, nor data rate are limited by what is given in this example.

Figure 4:
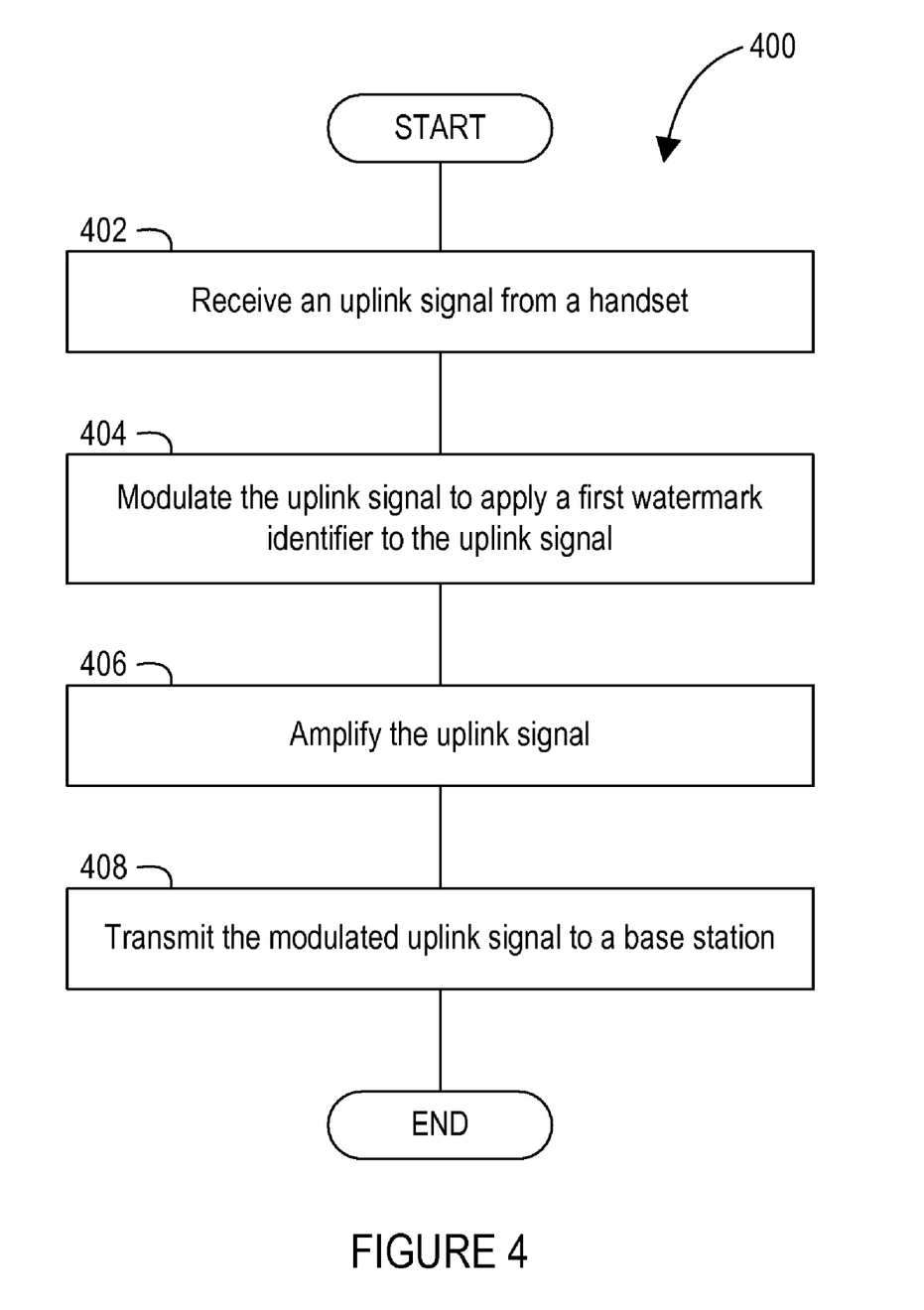
FIG. 4 is a flow diagram illustrating an embodiment of a method for applying a watermark to cellular signal, in accordance with the present invention.

FIG. 4 illustrates one embodiment of a method 400 of watermarking a cellular telephone signal. The method 400 may be practiced, for example, in a cellular repeater system. The method receives 402 an uplink signal from a handset. The uplink signal is modulated 404 in accordance with a first predetermined encoding scheme for applying a first watermark identifier to the uplink signal.

In one embodiment, the watermark identifier identifies at least one property or parameter of the cellular repeater system. A base station can decode the uplink signal in order to account for effects introduced by the cellular repeater system. For example, the watermark identifier may identify a delay time introduced to the uplink signal by the cellular repeater system so that the base station can compensate for the delay time.

In addition to modulating the uplink signal, the method 400 may also amplify 406 the uplink signal so that the uplink signal will have sufficient power to reach a target destination. The resultant uplink signal is transmitted 408 to the base station.

The method 400 may also be expanded to perform a similar operation on a downlink signal received from the base station. For example, the method 400 may receive a downlink signal from the base station, and modulate the downlink signal in accordance with a second predetermined encoding scheme for applying a second watermark identifier to the downlink signal. The resultant downlink signal is then transmitted to the handset.

In one embodiment, the first predetermined encoding scheme used for the uplink signals and the second predetermined encoding scheme used for the downlink signal are the same. Similarly, the first watermark identifier applied to the uplink signal and the second watermark identifier applied to the downlink signal may also be the same. In another embodiment, the first predetermined encoding scheme used for the uplink signals may be different from the second predetermined encoding scheme used for the downlink signal. Similarly, the first watermark identifier applied to the uplink signal may be different from the second watermark identifier applied to the downlink signal.

Figure 5:
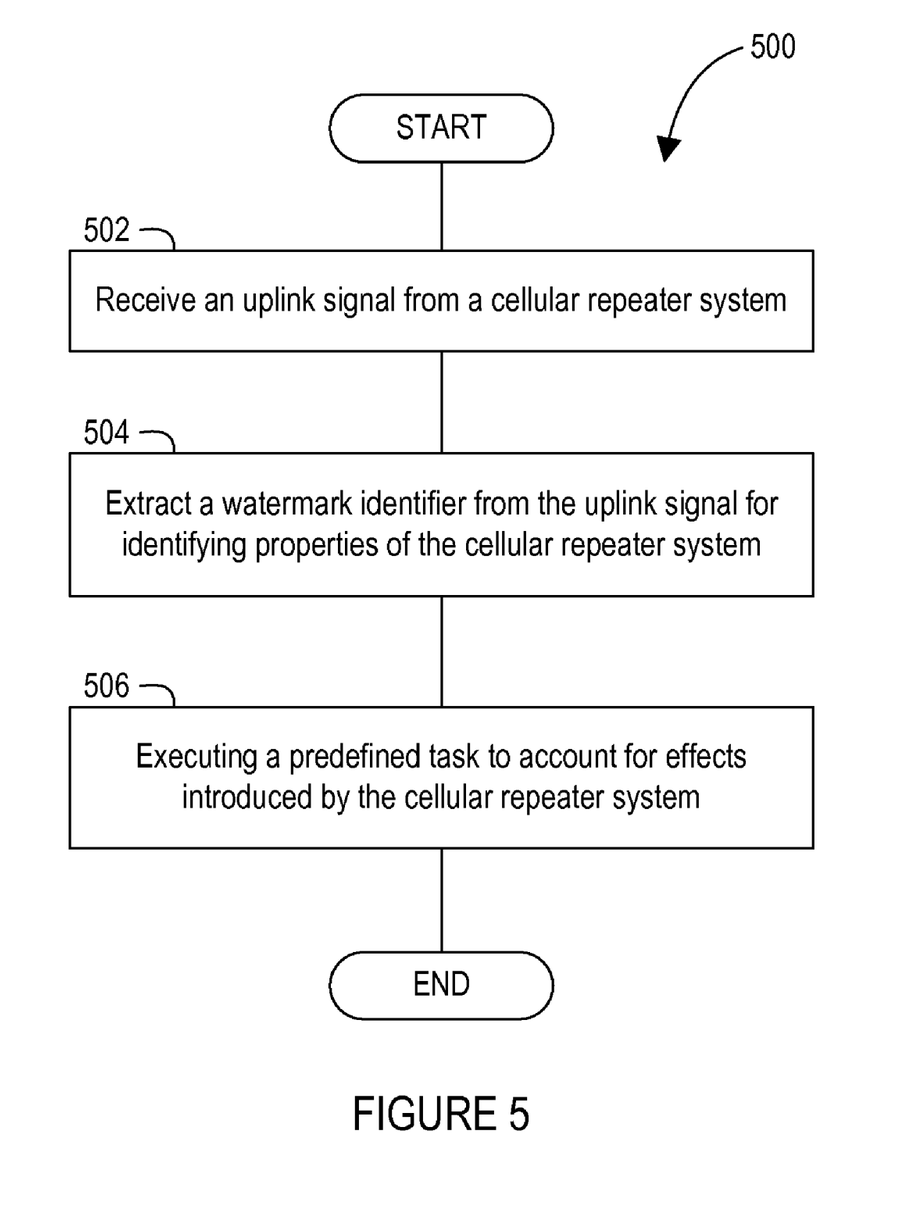
FIG. 5 is a flow diagram illustrating an embodiment of a method for processing an uplink signal having a watermark at a base station, in accordance with the present invention.

FIG. 5 illustrates one embodiment of a method 500 of processing an uplink mobile telephone signal. The method 500 may be practiced, for example, in a base station, as defined previously. The method 500 receives 502 an uplink signal that has been amplified and retransmitted by a cellular repeater system. A watermark identifier is then extracted 504 from the uplink signal. The watermark identifier may have been applied to the uplink signal by the cellular repeater system in accordance with a predetermined encoding scheme, and identifies at least one property of the cellular repeater system. In one embodiment, the watermark identifier is extracted by demodulating the uplink signal in accordance with a predetermined modulation scheme, such as amplitude modulation.

After extracting the watermark identifier, the method 500 executes 506 a predefined task in response to the at least one property of the cellular repeater system to account for effects introduced by the cellular repeater system. For example, if the cellular repeater delays the uplink signal by five microseconds, the base station may take steps that are necessary to ensure that the delay does not negatively impact the operation of the system. Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a cellular repeater system, a method for watermarking a cellular telephone signal, the method comprising:
    receiving an uplink signal from a handset;
    applying a first watermark identifier to the uplink signal by modulating the uplink signal in accordance with a first predetermined encoding scheme, wherein the first watermark identifier identifies effects introduced to the uplink signal by the cellular repeater system;
    transmitting the modulated uplink signal to a base station, wherein the base station accounts for the effects introduced by the cellular repeater system;
    receiving a downlink signal from the base station;
    modulating the downlink signal in accordance with a second predetermined encoding scheme for applying a second watermark identifier to the downlink signal wherein the first predetermined encoding scheme and the second predetermined encoding scheme are the same, and wherein the first watermark identifier and the second watermark identifier are the same; and
    transmitting the modulated downlink signal to the handset.

2. The method as recited in claim 1, wherein the watermark identifier identifies at least one property of the cellular repeater system and is decodable by a recipient of the uplink signal to be used to account for the effects introduced by the cellular repeater system.

3. The method as recited in claim 2, wherein the first watermark identifier identifies a delay time introduced to the uplink signal by the cellular repeater system.

4. The method as recited in claim 1, further comprising amplifying the uplink signal prior to transmitting to the base station.

5. In a cellular telephone system, a cellular repeater system with watermarking capabilities, the cellular repeater system comprising:
    a first antenna for communicating signals to and from a base station;
    a second antenna for communicating signals to and from a handset;
    a first variable gain module having an input coupled to the first antenna and an output coupled to the second antenna, the first variable gain module applying a first amplification factor to the signals received from the base station;
    a second variable gain module having an input coupled to the second antenna and an output coupled to the first antenna, the second variable gain module applying a second amplification factor to the signals received from the handset; and
    at least one message encoder configured to control at least one of the first amplification factor and the second amplification factor in accordance with a predetermined encoding scheme, wherein the signals received from the handset or from the base station are modulated with at least one watermark identifier according to the predetermined encoding scheme without affecting a performance of the cellular telephone system, wherein the at least one watermark identifier identifies effects introduced by the cellular repeater system and enables a recipient of the modulated signals to account for the effects identified by the watermark, wherein the at least one message encoder applies the at least one watermark identifier to the signals received from the base station and to the signals received from the handset using amplitude modulation and wherein the at least one message encoder utilized an identical watermark data rate for the signals received from the base station and the signals received from the handset.

6. The cellular repeater system as recited in claim 5, wherein the at least one message encoder applies the at least one watermark identifier to the signals received from the base station using amplitude modulation.

7. The cellular repeater system as recited in claim 5, wherein the at least one message encoder utilizes a first watermark data rate for the signals received from the base station and a second watermark data rate for the signals received from the handset, wherein the first and second watermark data rates are different.

8. The cellular repeater system as recited in claim 5, wherein the at least one watermark identifier includes a first watermark identifier and a second watermark identifier, wherein the at least one message encoder applies the first watermark identifier to the signals received from the base station and the second watermark identifier to the signals received from the handset, wherein the first and second watermark identifiers are different.

9. The cellular repeater system as recited in claim 5, wherein the at least one message encoder further comprises a first message encoder for controlling the first amplification factor and a second message encoder for controlling the second amplification factor.

10. The cellular repeater system as recited in claim 5, further comprising at least one low-pass data filter for filtering out the high frequencies of signals produced by the at least on message encoder.

* * * * *